(12) United States Patent
Amemiya et al.

(10) Patent No.: US 11,235,476 B2
(45) Date of Patent: Feb. 1, 2022

(54) ROBOT APPARATUS

(71) Applicant: FANUC CORPORATION, Yamanashi (JP)

(72) Inventors: Wataru Amemiya, Yamanashi (JP); Kuniyasu Matsumoto, Yamanashi (JP); Kousuke Imasaka, Yamanashi (JP); Moriaki Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/062,140

(22) Filed: Oct. 2, 2020

(65) Prior Publication Data

US 2021/0129358 A1   May 6, 2021

(30) Foreign Application Priority Data

Oct. 31, 2019   (JP) .............................. JP2019-198147

(51) Int. Cl.
*B25J 9/10* (2006.01)
*B25J 18/02* (2006.01)
*F16H 19/06* (2006.01)

(52) U.S. Cl.
CPC ............... *B25J 18/025* (2013.01); *B25J 9/10* (2013.01); *F16H 19/0636* (2013.01)

(58) Field of Classification Search
CPC .. B25J 18/025; B25J 9/10; B25J 18/02; F16H 19/0636
See application file for complete search history.

(56) References Cited

U.S. PATENT DOCUMENTS

| | | | | |
|---|---|---|---|---|
| 2,574,657 A * | 11/1951 | Pierce | ....................... | B66F 3/06 254/1 |
| 5,355,643 A * | 10/1994 | Bringolf | .................. | B66F 3/06 24/418 |
| 5,970,701 A * | 10/1999 | Roden | ..................... | F16G 13/20 59/78 |
| 6,419,603 B1 * | 7/2002 | Grasl | ........................ | B66F 3/06 474/148 |
| 7,621,078 B2 * | 11/2009 | Phelan | .................. | B66F 13/005 52/121 |
| 7,905,156 B2 * | 3/2011 | Scott | ........................ | B66D 1/54 74/89.21 |
| 9,248,576 B2 | 2/2016 | Yoon | | |
| 10,406,697 B2 * | 9/2019 | Yoon | ....................... | F16G 13/20 |
| 2012/0024091 A1 * | 2/2012 | Kawabuchi | .............. | B25J 18/06 74/37 |

FOREIGN PATENT DOCUMENTS

JP   5435679 B2   3/2014
JP   2015-213974 A   12/2015

* cited by examiner

*Primary Examiner* — David M Fenstermacher
(74) *Attorney, Agent, or Firm* — Nakanishi IP Associates, LLC

(57) ABSTRACT

A robot apparatus includes a base, a strut unit, and a linear expansion mechanism 1 rotatably supported on the strut unit. The linear expansion mechanism includes: a plurality of cylindrical bodies assembled in series to each other; a block train including a plurality of blocks coupled to each other in a row, the block at the leading end being connected to the cylindrical body at the leading end; and a housing part that houses the block train along an arc-shaped trajectory, the housing part being arranged below the cylindrical body at the trailing end and above the strut unit.

7 Claims, 16 Drawing Sheets

ROBOT APPARATUS

CROSS-REFERENCE TO RELATED APPLICATIONS

This application is based upon and claims the benefit of priority from the Japanese Patent Application No. 2019-198147, filed Oct. 31, 2019 the entire contents of which are incorporated herein by reference.

FIELD

Embodiments described herein relate generally to a robot apparatus.

BACKGROUND

As a linear expansion mechanism for a robot apparatus, a structure is known in which a first piece train including a plurality of first pieces (flat plates) coupled to each other by a rotating shaft in a bendable manner and a second piece train including a plurality of second pieces (blocks) similarly coupled to each other in a bendable manner are linked to each other to form a columnar arm unit, and the first piece train and the second piece train are separated from each other and housed as bendable columnar bodies in a vertical position in a strut unit (Patent Literature 1).

The linear expansion mechanism can extend the arm unit by increasing the numbers of the first and second pieces and is useful for applications in limited spaces since the arm unit does not protrude backward.

However, the structure requires two types of piece trains and therefore is complicated and inevitably heavy. In addition, the strength of the arm unit depends on the strength of the coupling between the pieces and the strength of the linkage between the two types of piece trains, so that there is a limit to the improvement of the strength of the arm unit.

Patent Literature 2 discloses a structure that uses a set of movable pieces to provide a linear expansion mechanism. The structure may be able to be simplified and reduced in weight because the structure requires only a set of movable pieces. However, the problem of the improvement of the strength of the arm unit remains unsolved because the arm unit is formed by the set of movable pieces, which are coupled to each other by a rotating shaft, and thus the strength of the arm unit depends on the strength of the coupling.

Furthermore, since the set of movable pieces are prevented from rotating downward, the set of movable pieces need to be housed at a location above the arm unit. For this reason, when the linear expansion mechanism is used in a robot apparatus, the housing needs to have a height enough to provide the required housing space and thus significantly protrudes upward beyond the arm unit. As a result, the robot apparatus inevitably has an increased overall height and an increased size. In addition, the arm unit capable of vertical rotation is essential for the robot apparatus. However, when the arm unit vertically rotates, the housing also needs to rotate along with the arm unit, and if the housing is large, the housing may limit the range of the vertical rotation of the arm unit. In addition, there is a problem that a back lash inevitably occurs between the drive gear for driving the set of movable pieces and the racks of the movable pieces, and therefore it is difficult to ensure high positional precision.

CITATION LIST

Patent Literature

Patent Literature 1: Japanese Patent No. 5435679
Patent Literature 2: Japanese Unexamined Patent Application Publication No. 2015-213974

SUMMARY OF INVENTION

Technical Problem

There is a demand for a robot apparatus having a linear expansion mechanism that is simplified in structure, reduced in weight, improved in strength of an arm unit and reduced in size while ensuring a wide range of vertical rotational movement of the arm unit.

Solution to Problem

A robot apparatus according to an aspect of the present disclosure includes: a base; a strut unit standing on the base, the strut unit having a first rotational joint having a first axis of rotation perpendicular to the base; and a linear expansion mechanism that is rotatably supported on the strut unit via a second rotational joint having a second axis of rotation perpendicular to the first axis of rotation. The linear expansion mechanism includes: a plurality of linear-motion elements assembled in series to each other; a block train including a plurality of blocks coupled to each other in a row, a block at a leading end of the plurality of blocks being connected to a linear-motion element at a leading end of the plurality of linear-motion elements; and a housing part that houses the block train along an arc-shaped trajectory, the housing part being arranged below a linear-motion element at a trailing end of the plurality of linear-motion elements and above the strut unit.

According to this aspect, a robot apparatus having a linear expansion mechanism can be provided which is simplified in structure, reduced in weight, improved in strength of an arm unit and reduced in size while ensuring a wide range of vertical rotational movement of the arm unit.

DETAILED DESCRIPTION

In the following, an embodiment of the present disclosure will be described with reference to the drawings.

Figure 1:
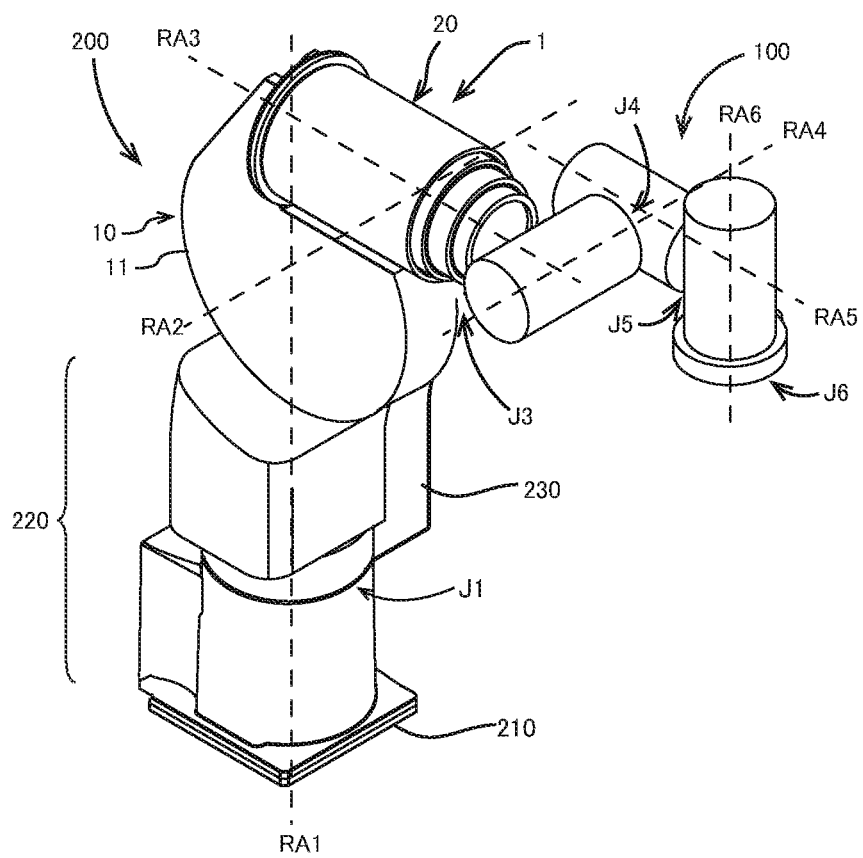
FIG. 1 is a front perspective view of a robot apparatus according to an embodiment.
Figure 2:
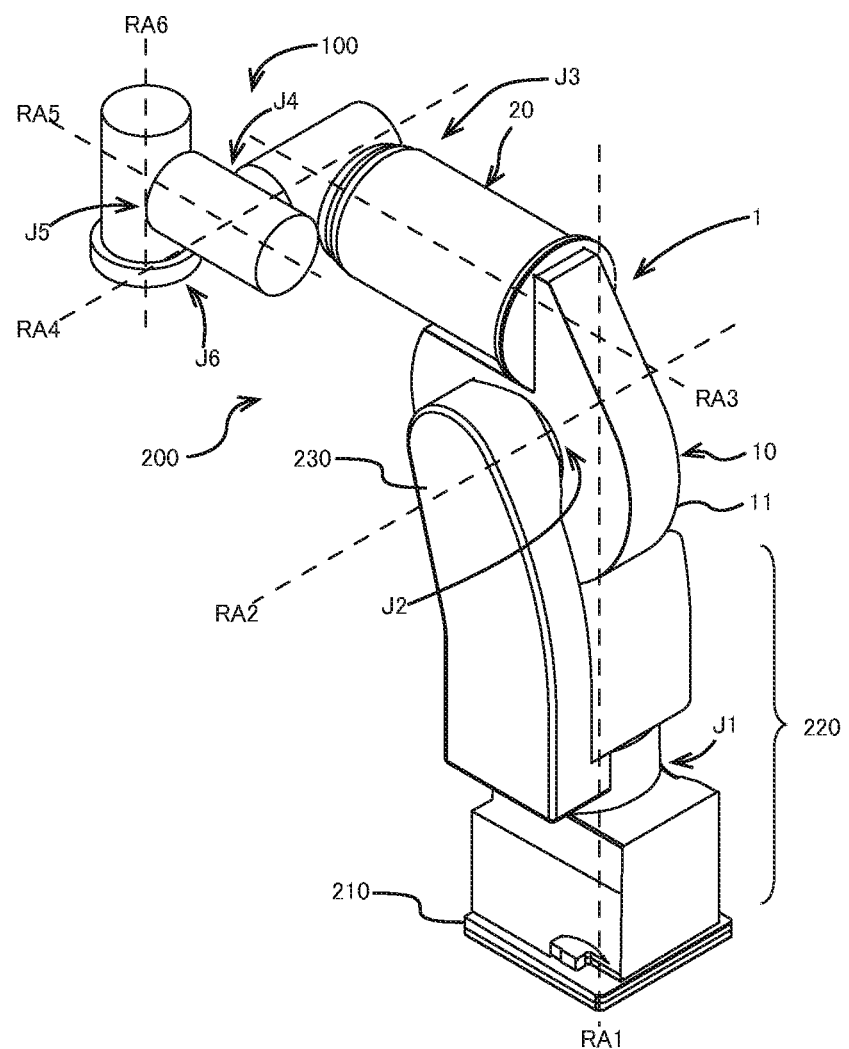
FIG. 2 is a rear perspective view of the robot apparatus in FIG. 1.
Figure 3:
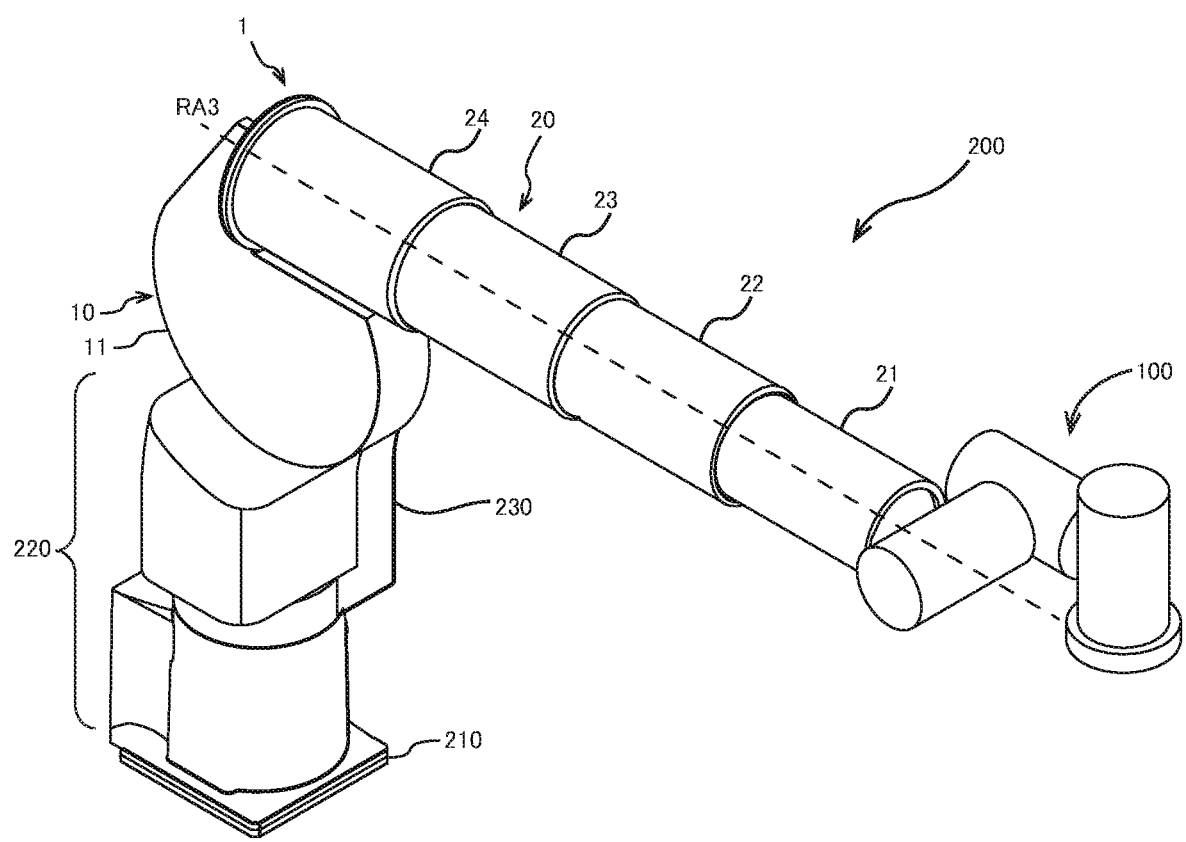
FIG. 3 is a perspective view of the robot apparatus in FIG. 1 with an arm unit being expanded.

As shown in FIGS. 1, 2 and 3, a robot apparatus 200 according to this embodiment includes a base 210 having the shape of a flat plate and a strut unit 220 vertically standing on the base 210. The strut unit 220 is vertically divided into two parts, which are rotatably connected to each other by a first rotational joint J1 having an axis of rotation (first axis of rotation RA1) perpendicular to the base 210. An upper part of the strut unit 220 vertically rotatably supports a linear expansion mechanism 1 via a second rotational joint J2 having an axis of rotation (second axis of rotation RA2) perpendicular to the first axis of rotation RA1.

The linear expansion mechanism 1 has a housing part 10 and an arm unit 20 capable of expansion. The housing part 10 is supported by the axis of rotation RA2 of the second rotational joint J2 in a housing 11 thereof. The axis of rotation RA2 is supported by a side frame 230 fixed to the upper part of the strut unit 220. The arm unit 20 is fixed to an upper part of the housing 11 at a rear end thereof. The arm unit 20 is provided with a wrist unit 100, which includes three rotational joints J4, J5 and J6 whose axes of rotation are perpendicular to each other, at a front end thereof. The rotational joint J4 has an axis of rotation RA4 perpendicular to an axis of linear motion RA3. The rotational joint J5 has an axis of rotation RA5 perpendicular to the axis of rotation RA4. The rotational joint J6 has an axis of rotation RA6 perpendicular to the axes of rotation RA4 and RA5. A front end face of the wrist unit 100 is provided with an adapter to which an end effector (not shown), such as a gripper, is attached.

The arm unit 20 forms a third linear joint J3 having the axis of linear motion RA3 perpendicular to the second axis of rotation RA2. As shown in FIG. 3, the arm unit 20 can expand and contract along the axis of linear motion RA3. The arm unit 20 is hollow inside, and a block train described later is inserted into the arm unit 20. The block train serves as an actuator that causes expansion and contraction of the arm unit 20.

Figure 4:
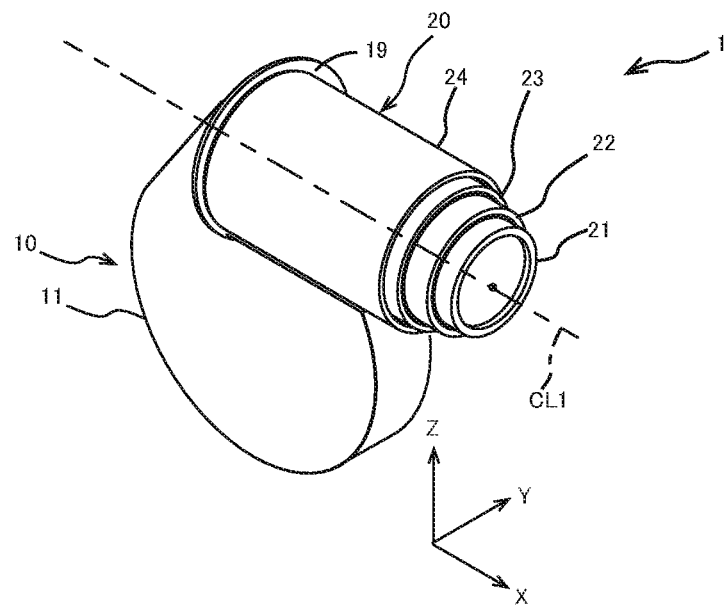
FIG. 4 is a perspective view of a linear expansion mechanism in FIG. 1 in a contracted state.
Figure 5:
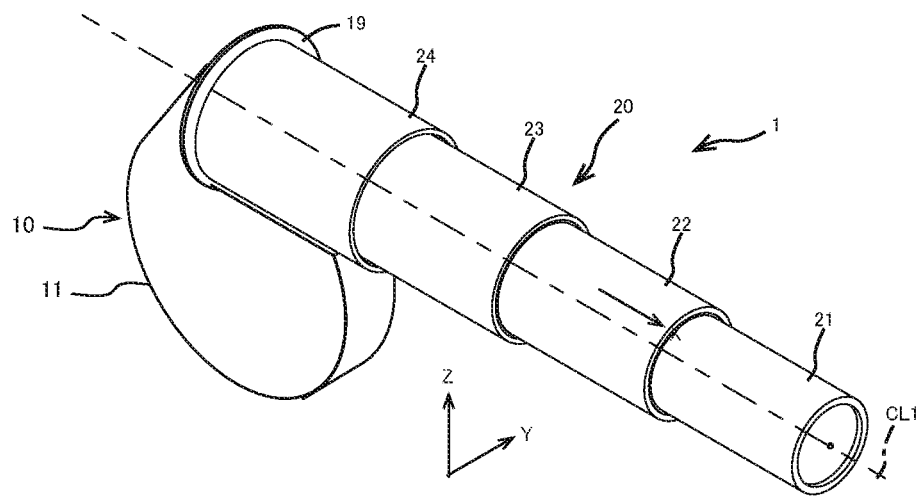
FIG. 5 is a perspective view of the linear expansion mechanism in FIG. 1 in an expanded state.

As shown in FIGS. 4 and 5, the arm unit 20 includes a plurality of linear-motion elements assembled in series to each other. Typically, the liner-motion elements are cylindrical bodies. The arm unit 20 includes a plurality of, four in this embodiment, cylindrical bodies 21, 22, 23 and 24 assembled in a telescopic structure (a multi-level nested structure). The cylindrical bodies 21, 22, 23 and 24 typically have a circular cylindrical shape but may have a polygonal cylindrical shape.

Figure 6:
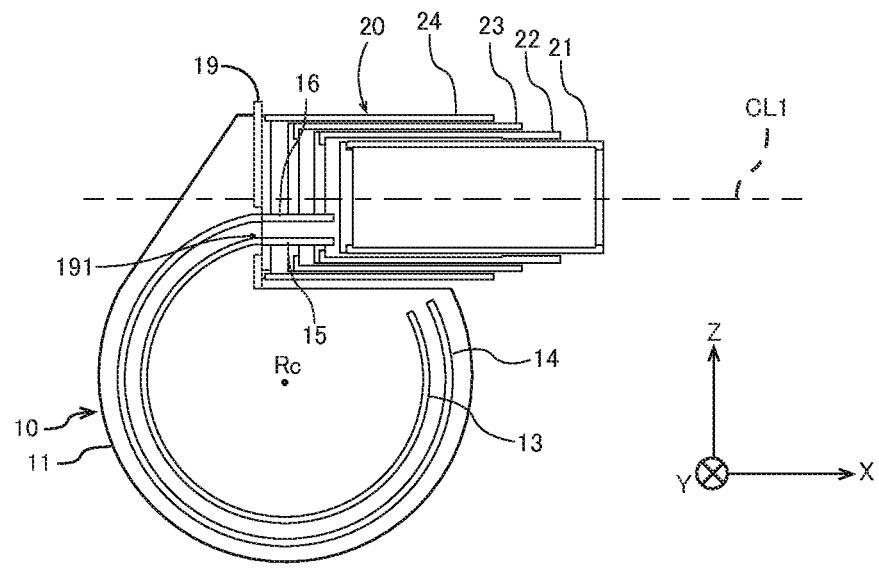
FIG. 6 is a side view showing the internal structure except a block train of the linear expansion mechanism in FIG. 1 in the contracted state.
Figure 7:
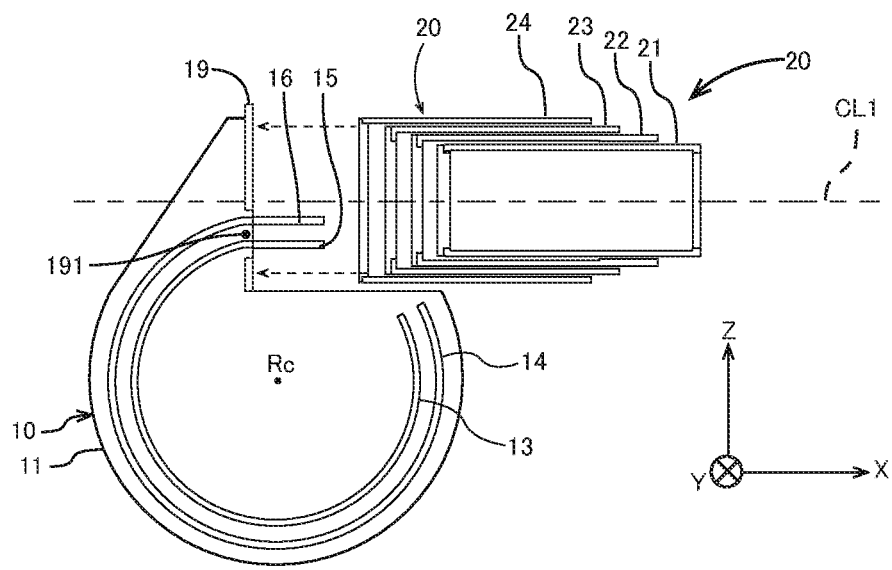
FIG. 7 is a side view of the linear expansion mechanism in FIG. 6, showing a housing and an arm unit separated from each other.

The arm unit 20 is supported on an end face of the housing 11 of the housing part 10 for housing a block train 30. Typically, the housing 11 substantially has the shape of a short cylinder approximately an upper quadrant of which is cut away. As shown in FIGS. 6 and 7, the cut upper part of the housing 11 is closed by a lid plate 19. A rear end of the arm unit 20 or, in other words, a cylindrical body 24 at the trailing end of the arm unit 20 is perpendicularly fixed to the lid plate 19 at a trailing end flange thereof. The lid plate 19 to which the cylindrical body 24 at the trailing end is fixed has an opening 191 formed therein. Through the opening 191, the interior of the housing 11 and the hollow interiors of the cylindrical bodies 21, 22, 23 and 24 are in communication with each other. The block train 30 described later passes through the opening 191.

Figure 8:
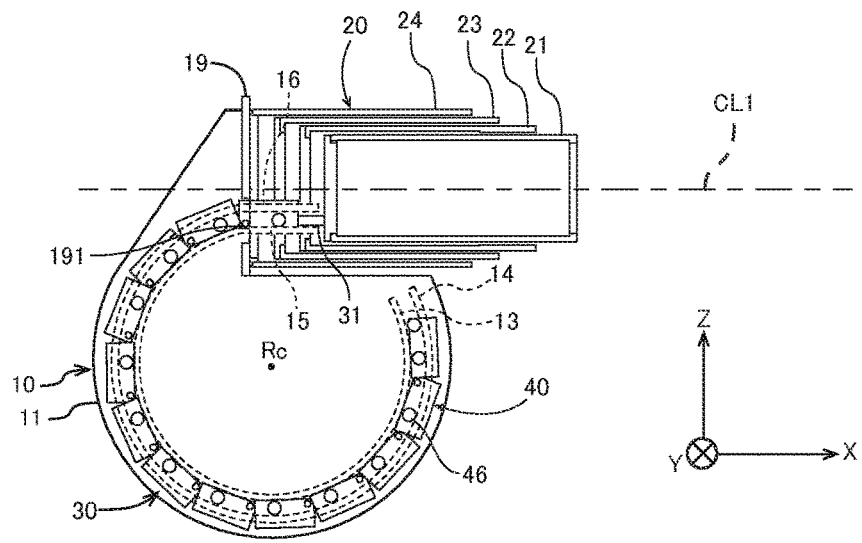
FIG. 8 is a side view showing the internal structure of the linear expansion mechanism in FIG. 1 in the contracted state.
Figure 9:
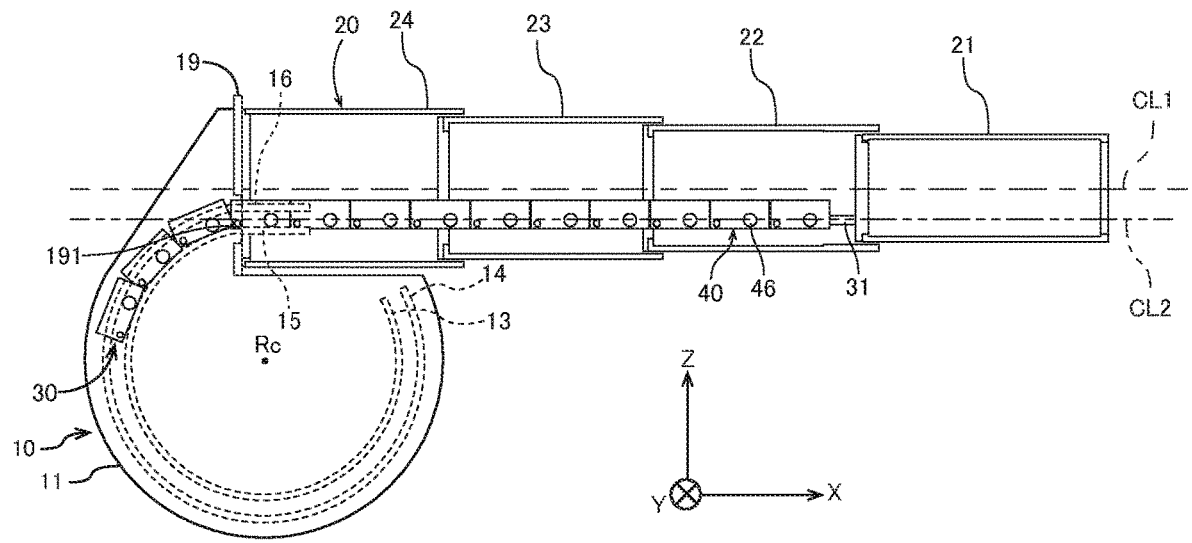
FIG. 9 is a side view showing the internal structure of the linear expansion mechanism in FIG. 1 in the expanded state.

As shown in FIGS. 8 and 9, the block train 30 is housed in the interior space of the housing 11. The housing 11 forms the housing part 10 in cooperation with rails or the like described later. The block train 30 is formed by a plurality of blocks 40 coupled to each other in a row. The block train 30 is inserted in the cylindrical bodies 21, 22, 23 and 24. The block 40 at the leading end of the block train 30 is connected to the cylindrical body 21 at the leading end of the plurality of cylindrical bodies 21, 22, 23 and 24 by a connector piece 31. The block 40 at the leading end is connected to a part of the cylindrical body 21 at the leading end where the block train 30 delivered from inside the housing 11 can linearly move along a straight trajectory CL2 (axis of movement CL2) that is parallel to a cylinder centerline CL1. The opening 191 described above is positioned so that the axis of movement CL2 intersects with the plane of the opening.

The housing part 10 that houses the block train 30 is arranged above the strut unit 220. Furthermore, the housing part 10 is arranged below the rear end of the arm unit 20, more specifically, below the rear end of the cylindrical body 24 at the trailing end. The housing 11 of the housing part 10 does not significantly extend upward beyond the rear end of the cylindrical body 24 at the trailing end. Therefore, the overall height of the robot apparatus can be reduced, the robot apparatus can be reduced in size and installed in a narrow space, and restrictions on the rotational operations thereof can be reduced.

The housing 11 is supported by the second rotational joint J2 with a cylinder centerline Rc thereof being aligned with the axis of rotation RA2 of the second rotational joint J2 and the center of the arc-shaped trajectory of the block train 30 being positioned on the axis of rotation RA2. The housing 11 can be smoothly rotated as the block train 30 is delivered and retracted.

In the housing part 10, the block train 30 is housed along an arc-shaped trajectory centered about the centerline RC of the housing 11 having the shale of a short cylinder. When the arm unit 20 is contracted to the maximum, most of the block train 30 is housed in the housing 11. Although not shown, a drive mechanism for delivering and retracting the block train 30 is provided in the housing 11. The drive mechanism is typically a rack and pinion mechanism but can also be any other mechanism, such as a ball screw mechanism.

A basic expansion and contraction operation of the linear expansion mechanism 1 is as follows.

The block train 30 housed in the housing 11 is delivered into the arm unit 20 through the opening 191 by the drive mechanism, and the block 40 at the leading end moves forward along the axis of movement CL2. Since the block 40 at the leading end is connected to the cylindrical body 21 at the leading end, as the block 40 at the leading end moves forward, the cylindrical bodies 21, 22 and 23 are sequentially pushed out of the cylindrical body 24 at the trailing end, which is fixed to the housing 11. In this way, the arm unit 20 expands forward along the cylinder centerline CL1.

As the drive mechanism retracts the block train 30 delivered into the arm unit 20 back into the housing 11 through the opening 191, the block 40 at the leading end moves backward along the axis of movement CL2. As the block 40 at the leading end moves backward, the cylindrical body 21 at the leading end is retracted into the cylindrical body at the rear thereof, which is also retracted into the cylindrical body at the rear thereof, and so on. In this way, the arm unit 20 contracts backward along the cylinder centerline CL1.

As described above, the block train 30 forms a part of an actuator that causes expansion and contraction of the arm unit 20. Since the arm unit 20 is formed by the plurality of cylindrical bodies 21, 22, 23 and 24 assembled in a multi-level nested structure, and the actuator for expanding and contracting the arm unit 20 is formed by the single block train 30, the structure is simplified, the weight is reduced, and the strength of the arm unit 20 is improved by the cooperation of the multi-level nested structure and the block train.

Figure 10:
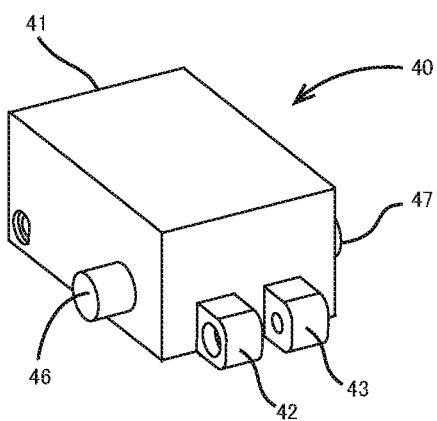
FIG. 10 is a front perspective view of a block in FIG. 8.
Figure 11:
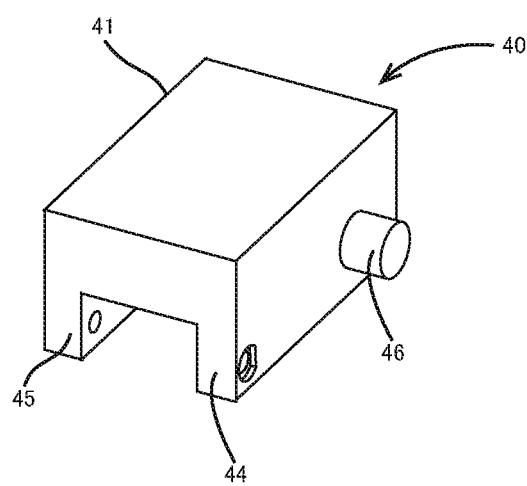
FIG. 11 is a rear perspective view of the block in FIG. 8.
Figure 12:
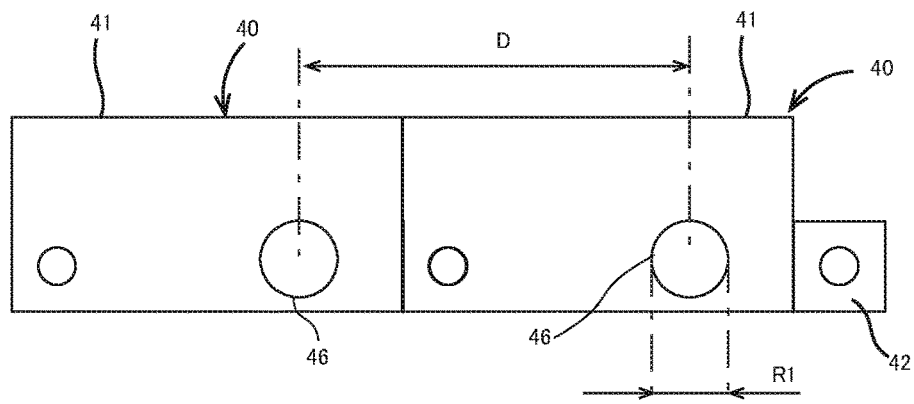
FIG. 12 is a side view of the blocks in FIG. 8.

As shown in FIGS. 10 and 11, the block 40 has a block main body 41. The block main body 41 has the shape of a rectangular parallelepiped, for example. The block main body 41 has two bearings 42 and 43 provided to protrude forward in a lower part of the front end thereof in such a manner that the bearings 42 and 43 are spaced apart from each other in the width direction of the block main body 41. The block main body 41 has bearings 44 and 45 provided integrally with the block main body 41 in a lower part of the rear end thereof in such a manner that the bearings 44 and 45 are spaced apart from each other in the width direction of the block main body 41. The bearings 42 and 43 on the front end of one of two adjacent blocks 40 are fitted into the space between the bearings 44 and 45 on the rear end of the other of the two adjacent blocks 40, and a rotating shaft (not shown) is inserted into the holes of the bearings. In this way, the blocks 40 are rotatably coupled to each other in a row. The blocks 40 are coupled to each other in a row in the direction (direction of coupling) perpendicular to the rotating shaft. As shown in FIG. 12, since the bearings 42, 43, 44 and 45 are provided closer to the bottom of the block main body 41, and the block main bodies 41 have the shape of a rectangular parallelepiped, adjacent two blocks 40 once arranged in a straight line abut against each other at the end faces thereof, and therefore, the blocks 40 are prevented from further rotating upward, although the blocks 40 can rotate downward.

The block main body 41 has a pair of projection bodies 46 and 47 projecting sideward, one on each side face thereof. The pair of projection bodies 46 and 47 are to be engaged with a pair of arc-shaped rails 13 and 14 described later. Typically, the projection bodies 46 and 47 can be cam followers that can roll on the pair of arc-shaped rails 13 and 14. The cam followers are attached to the block main body 41 in such a manner that the axis of rotation of the outer ring of each cam follower is parallel to and the same as the rotating shaft of the block 40. The projection bodies 46 and 47 may be simple projections having a cylindrical or other shape. However, the description herein is made on the assumption that the projection bodies 46 and 47 are cam followers.

Figure 13:
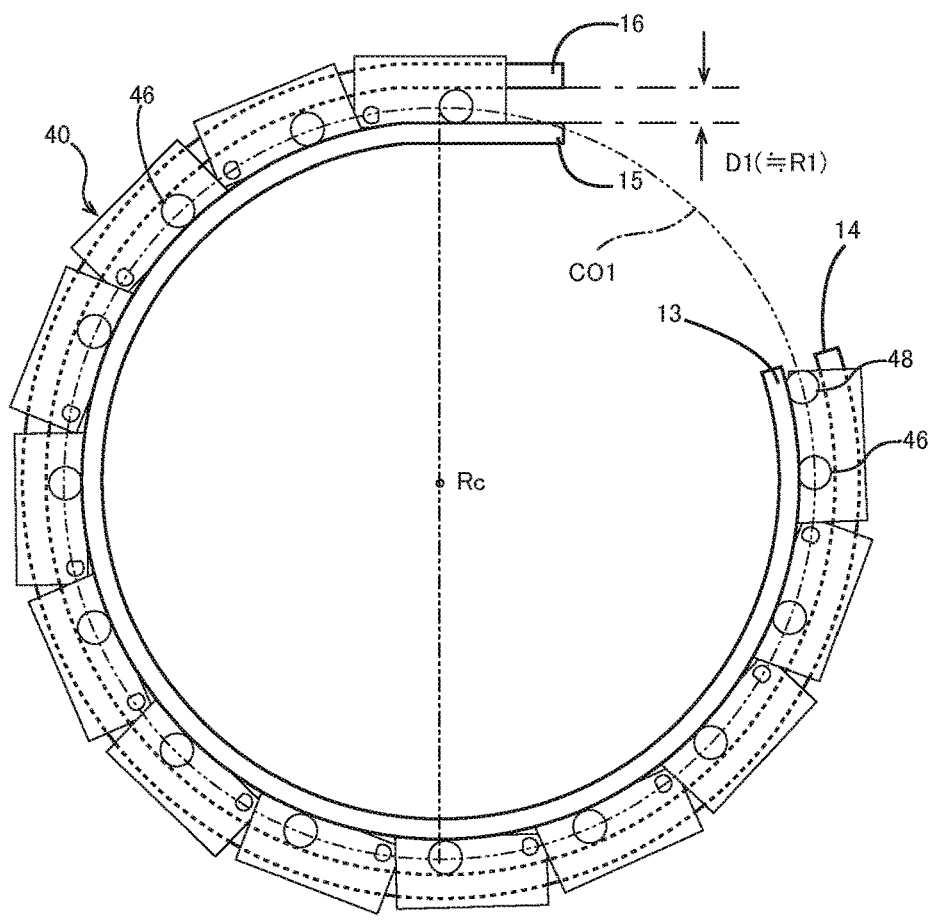
FIG. 13 is a side view showing a pair of rails provided in a housing along with the blocks.

As shown in FIG. 13, in order that the block train 30 can smoothly move along an arc-shaped trajectory, the cam followers 46 and 47 are positioned with respect to the block main body 41 in such a manner that the axis of rotation of the outer ring of the cam follower 46 (47) is located on a circle CO1 that is concentric with an arc-shaped trajectory (arc-shaped rails 13 and 14 described later) centered about the centerline Rc along with the rotating shafts coupling the blocks 40 to each other, when viewed in side view. As a result, the block train 30 is housed along the arc-shaped trajectory in the housing 11 under the constraint of the arc-shaped rails 13 and 14.

The rails 13 and 14 constrains only the cam followers 46 and 47 of the block 40. The cam followers 46 and 47 are coaxially attached to the block main body 41 one on each side face thereof, so that the block 40 can slightly rotate about the cam followers 46 and 47. Therefore, the block train 30 may be bent in the housing part and therefore be unable to smoothly move.

Figure 14:
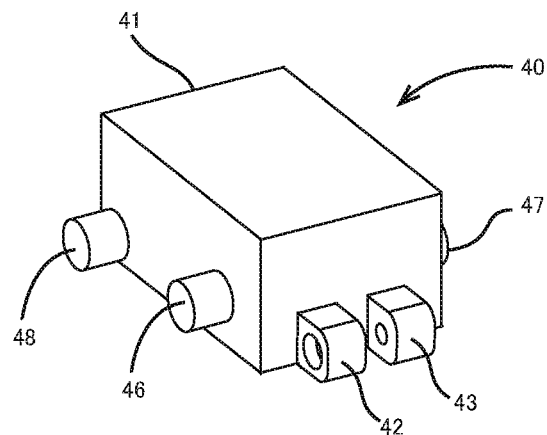
FIG. 14 is a front perspective view of the block at the trailing end of a block train in FIG. 13.
Figure 15:
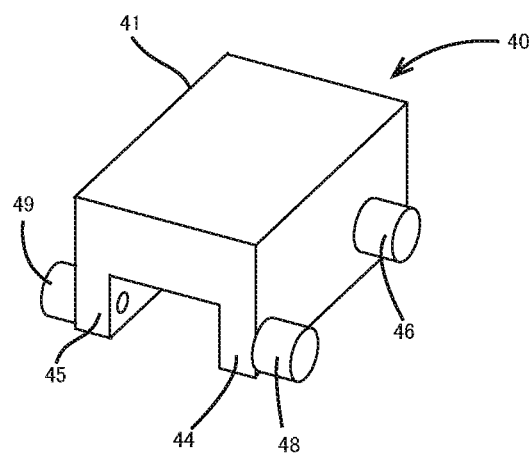
FIG. 15 is a rear perspective view of the block at the trailing end in FIG. 14.

To avoid this, according to this embodiment, as shown in FIGS. 14 and 15, the block main body 41 of the block 40 at the trailing end of the block train 30 has two cam followers 46 and 48 on one side face thereof and two cam followers 47 and 49 on the other side face thereof. The two cam followers on each side face of the block main body 41 are positioned with respect to the block main body 41 in such a manner that the cam followers are located on the circle CO1. Since the block main body 41 has two cam followers on each side face thereof, the posture of the block 40 at the trailing end is fixed along the rails 13 and 14. The block 40 adjacent to the block 40 at the trailing end is constrained at two parts thereof by the cam followers 46 and 47 of itself and the rotating shaft coupling the block 40 to the block 40 at the trailing end, so that the posture of the block 40 is fixed along the rails 13 and 14, as with the block 40 at the trailing end. The other blocks 40 located toward the front are also each constrained at two parts thereof by the cam followers 46 and 47 of itself and the rotating shaft coupling the block 40 to the following block 40, so that the posture thereof is fixed along the rails 13 and 14. In this way, the postures of all the blocks 40 are adjusted to be the same as the posture of the block 40 at the trailing end in a cascade manner. Therefore, the block train 30 is not bent in the housing part and can smoothly move in a fixed posture along the arc-shaped trajectory.

The projection bodies to be engaged with the rails 13 and 14 are not limited to the cam followers, as far as they ensure that the blocks 40 can move along the rails 13 and 14. The projection body may be a rolling body that rolls on the surface of the rail or a sliding body that slides on the surface of the rail, as appropriate. The rolling body may be any of various bearings, such as those having a cylindrical shape, a needle-like shape, a rod-like shape, a conical shape and a spherical shape. The sliding body may be a cylindrical body or a rod-shaped body at least a face of which that is to come into contact with the rail 13 or 14 is made of a self-lubricating resin material.

The block 40 having two cam followers on each side face thereof may not be the block 40 at the trailing end but may be any of the blocks 40 that is located in the housing 11

(within the rails 13 and 14) when the arm unit 20 expands to the maximum. Alternatively, all the blocks 40 may have two cam followers on each side face thereof, or every several blocks 40 may have two cam followers on each side face thereof. Furthermore, instead of attaching two cam followers to each side face of the block 40 at the trailing end, the block 40 may be provided with one cam follower 46 on one side face thereof and one cam follower 47 on the other side face thereof with the axes of rotation thereof being shifted in the longitudinal direction, thereby fixing the posture of the block 40 along the rails 13 and 14.

Figure 16:
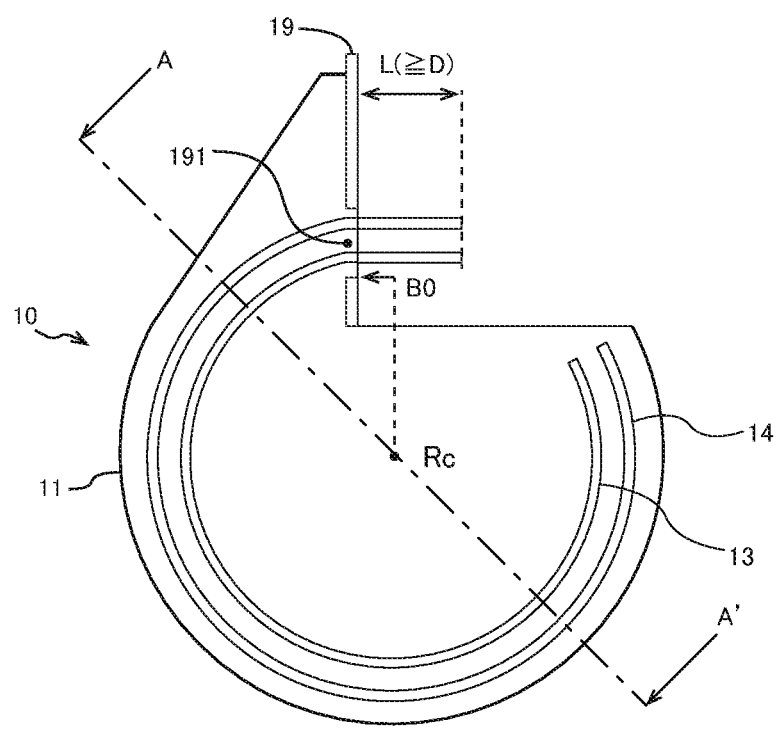
FIG. 16 is a side view of the rails in FIG. 13.
Figure 17:
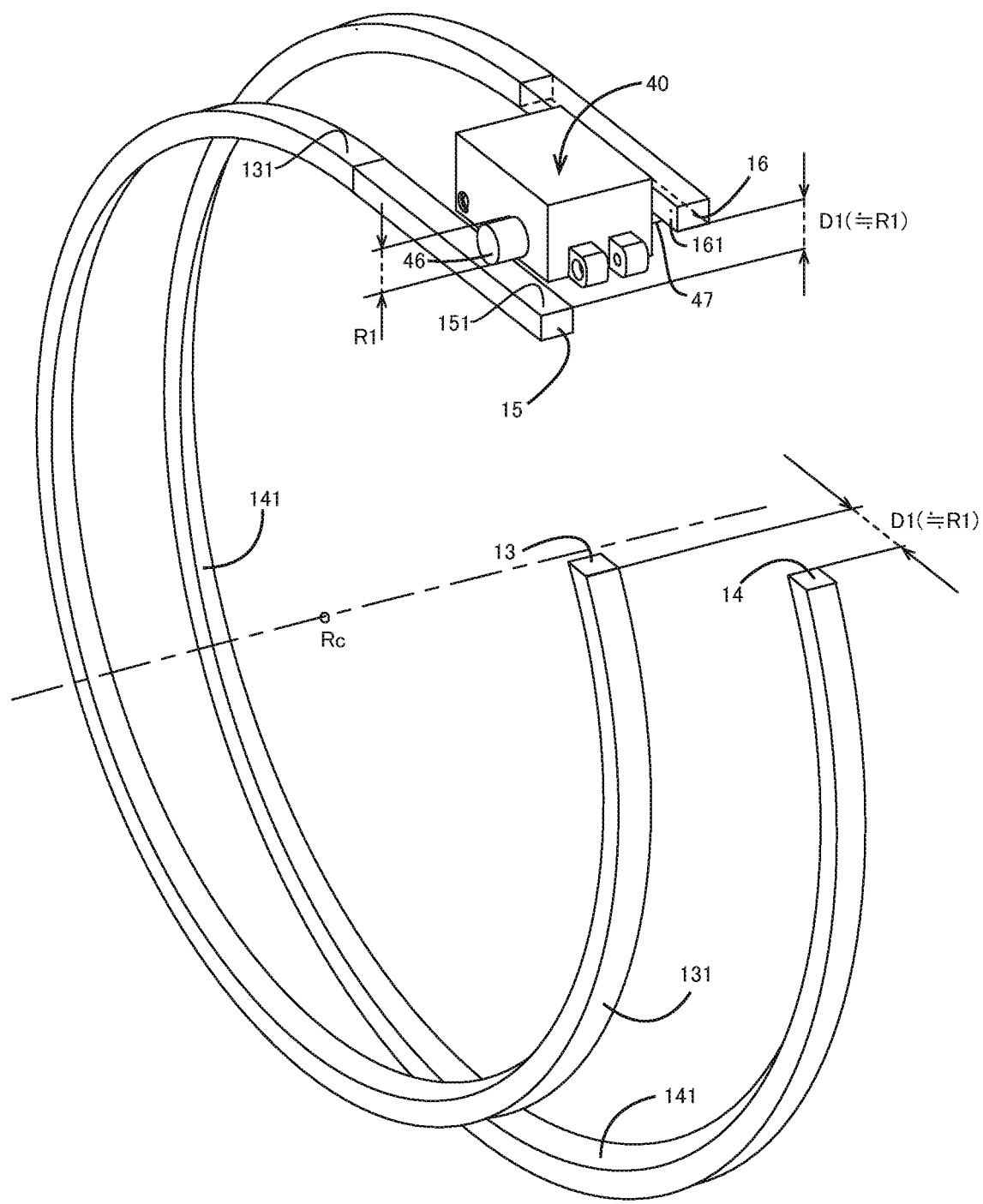
FIG. 17 is a perspective view of the rails in FIG. 13.

As shown in FIGS. 16 and 17, in order to smoothly house the block train 30 along the arc-shaped trajectory, the housing part 10 has the pair of arc-shaped rails 13 and 14 that guide the cam followers 46 and 47 attached to the block 40. The arc-shaped rails 13 and 14 independently guide the cam followers 46 and 47 from inside and outside, respectively. The arc-shaped rails 13 and 14 have different radii. The arc-shaped rails 13 and 14 are concentric, and the center of the arc-shaped rails 13 and 14 lies on the centerline Rc of the housing 11. The block train 30 moves along the arc-shaped rails 13 and 14, and the centerline Rc of the housing 11 agrees with the second axis of rotation RA2 of the second rotational joint J2, so that the block train 30 moves and is housed in an arc-shaped trajectory centered about the second axis of rotation RA2 of the second rotational joint J2.

To prevent the cam followers 46 and 47 from reversely rotating against the direction of movement of the blocks 40 and inhibiting the movement of the blocks 40, the arc-shaped rails 13 and 14 are separately arranged on the opposite sides of the block train 30 and spaced apart from each other at a distance slightly greater than the width of the blocks 40 in the direction of the centerline of the housing 11. This arrangement will be described in detail below. In FIG. 17, reference numerals 131 and 141 denote guide faces of the pair of arc-shaped rails 13 and 14 on which the outer rings of the cam followers 46 and 47 roll. The radii of the pair of arc-shaped rails 13 and 14 are set in such a manner that the guide faces 131 and 141 are spaced apart from each other in side view at a distance slightly greater than a diameter R1 (see FIG. 12) of the cam followers 46 and 47 over the entire areas thereof. In other words, the radii of the guide faces 131 and 141 of the cam followers 46 and 47 differ from each other by a distance slightly greater than the diameter R1 of the cam followers 46 and 47. One arc-shaped rail 13 serves as an inner rail 13 that has a shorter radius than the other, guides the cam follower 46 on one side face of the block 40 from inside and defines the trajectory of the block train 30 from inside. The other arc-shaped rail 14 serves as an outer rail 14 that has a longer radius than the inner rail 13, guides the cam follower 47 on the other side face of the block 40 from outside and defines the trajectory of the block train 30 from outside.

The block 40 is constrained by rails 13 and 14 at the side faces thereof as described later, and the block train 30 is formed into an arc-shaped trajectory and housed, the block train 30 is prevented from rotating about the axis thereof and therefore does not come off the pair of arc-shaped rails 13 and 14.

The outer ring of the cam follower 46 on one side face of the block 40 rolls only on the outer guide face 131 of the inner rail 13, and the outer ring of the cam follower 47 on the opposite side of the block 40 rolls only on the inner guide face 141 of the outer rail 14. That is, the outer rings of the cam followers 46 and 47 on the opposite sides rotate in the opposite directions with respect to the guide faces 131 and 141, respectively, although both the outer rings rotate in the forward direction with respect to the direction of movement of the block train 30. If the block train 30 moves with the cam follower on one side face of the block 40 being held between the inner rail and the outer rail, the outer ring of the cam follower rotates in the forward direction with respect to one of the rails, whereas the outer ring of the cam follower rotates in the opposite direction with respect to the other rail to inhibit the movement of the block train, and therefore the block train 30 cannot smoothly move. According to this embodiment, the inner rail 13 and the outer rail 14 are separately arranged on the opposite sides of the block train 30, and each of the outer rings of the cam followers 46 and 47 on the opposite sides rolls only on one of the inner rail 13 and the outer rail 14, so that the cam followers 46 and 47 do not rotate in the direction to inhibit the movement of the block train 30. Therefore, the block train 30 can be smoothly delivered and retracted along the arc-shaped trajectory, and thus the arm unit 20 can also be smoothly expanded and contracted.

As shown in FIG. 16, the arc-shaped rails 13 and 14 typically have a length equivalent to three quarters of the circumference of the circle. The circumferential length of the arc-shaped rails 13 and 14 is preferably slightly reduced. If the length of the arc-shaped rails 13 and 14 is reduced as described above, the lid plate 19 of the housing 11 is also retracted by a tangential distance BO, which is equivalent to 8 degrees by which the length of the arc-shaped rails 13 and 14 is reduced, with the orientation being kept parallel to the radius or, in other words, perpendicular to the cylinder center line CL1. Since the rear end of the arm unit 20 is fixed to the lid plate 19, the movable portion of the arm can be slightly brought closer to the housing 11, and accordingly, the access to the base of the arm is improved.

Since the arm unit 20 is perpendicularly attached to the lid plate 19 that is parallel to the radius, and the circumferential length of the arc-shaped rails 13 and 14 is slightly reduced, the tangent to the arc-shaped rails 13 and 14 at the leading ends thereof and the cylinder centerline CL1 are not parallel to each other and slightly intersect with each other. Therefore, when the block train 30 is delivered, the trajectory slightly but discontinuously changes direction at the point where the trajectory shifts from the arc-shaped trajectory to the straight trajectory. Similarly, when the block train 30 is retracted into the housing part, the trajectory of the block train 30 discontinuously changes direction. The discontinuous change in direction may cause a vertical rattling or a gentle curvature of the block train 30. To minimize such a rattling or curvature of the block train 30, straight rails 15 and 16 are spliced to the leading ends of the arc-shaped rails 13 and 14. As shown in FIGS. 16 and 17, the straight rail 15 extends from the leading end of the arc-shaped rail 13 in parallel to the cylinder centerline CL1. Similarly, the straight rail 16 extends from the leading end of the arc-shaped rail 14 in parallel to the cylinder centerline CL1. In order that the vertical and horizontal distances between the pair of straight rails 15 and 16 are the same as the vertical and horizontal distances between the leading ends of the pair of arc-shaped rails 13 and 14, guide faces 151 and 161 of the pair of straight rails 15 and 16 are spaced apart from each other in side view by a distance D1, which is substantially equal to the diameter R1 of the cam followers 46 and 47, over the entire areas thereof.

As shown in FIG. 16, the straight rails 15 and 16 have a length L that is equal to a distance D between the axes of rotation of the cam followers 47 of two adjacent blocks 40. When the block train 30 is delivered from the arc-shaped rails 13 and 14 or retracted onto the arc-shaped rails 13 and 14, the straight rails 15 and 16 always constrain only the cam followers 46 and 47 of one block 40. That is, when the cam followers 46 and 47 of one block 40 leave the straight rails 15 and 16, the cam followers 46 and 47 of the adjacent block 40 are introduced onto the straight rails 15 and 16. Since the straight rails 15 and 16 always constrain only the cam followers 46 and 47 of one block 40, when that block 40 and the adjacent block 40 pass through the joint between the arc-shaped rails 13 and 14 and the straight rails 15 and 16, the relative positions thereof change, but the change always occurs in the same way. In other words, the block train 30 always passes through the joint between the arc-shaped rails 13 and 14 and the straight rails 15 and 16 in the same trajectory. Therefore, the positional precision can be ensured. Although the straight rails 15 and 16 can have any length equal to or greater than the distance D between the axes of rotation of two adjacent cam followers 46 or 47, the length is preferably equal to the distance D between the axes of rotation from the viewpoint of weight reduction and ease of rotation.

Figure 18:
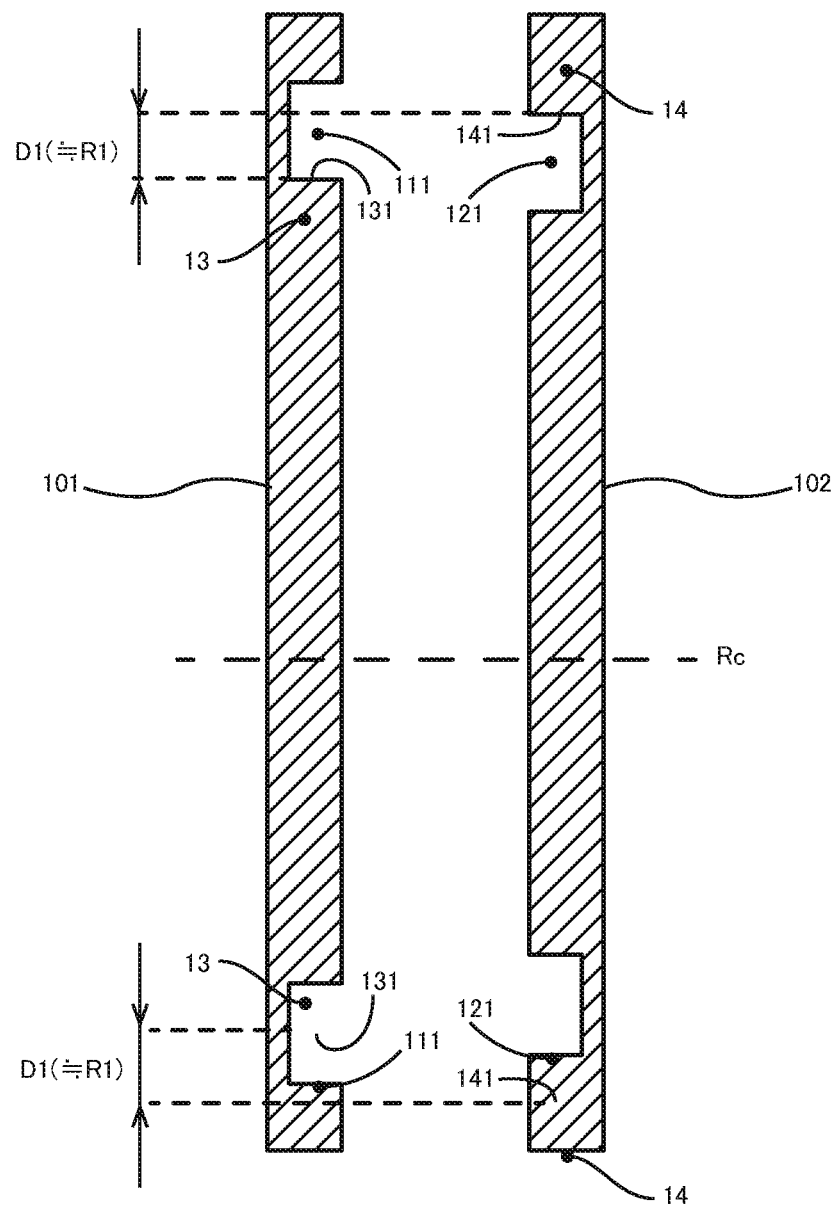
FIG. 18 is a cross-sectional view taken along the line A-A' in FIG. 16.

The arc-shaped rails 13 and 14 are configured as a part of a torus. However, from the viewpoint of efficiency of manufacture, the arc-shaped rails 13 and 14 are preferably formed by forming arc-shaped grooves 111 and 121 in disk-shaped rail plates 101 and 102 having a fixed thickness. As shown in FIG. 18, the disk-shaped rail plates 101 and 102 are arranged parallel to each other at such a distance that the distance between the bottoms of the pair of grooves 111 and 121 is slightly greater than the overall width of the pair of cam followers 46 and 47. The depth of the pair of grooves 111 and 121 is equal to the overall length (height) of the outer rings of the cam followers 46 and 47. The width of the pair of grooves 111 and 121 is sufficiently greater than the diameter of the outer rings of the cam followers 46 and 47.

An arc-shaped groove having a greater diameter (outer groove 111) is formed in one disk-shaped rail plate 101, and an arc-shaped groove having a smaller diameter (inner groove 121) concentric with the outer groove 111 is formed in the other disk-shaped rail plate 102. In side view, the outer groove 111 and the inner groove 121 overlap with each other in the width direction thereof by a distance that is slightly greater than the diameter R1 of the cam followers 46 and 47.

Figure 19:
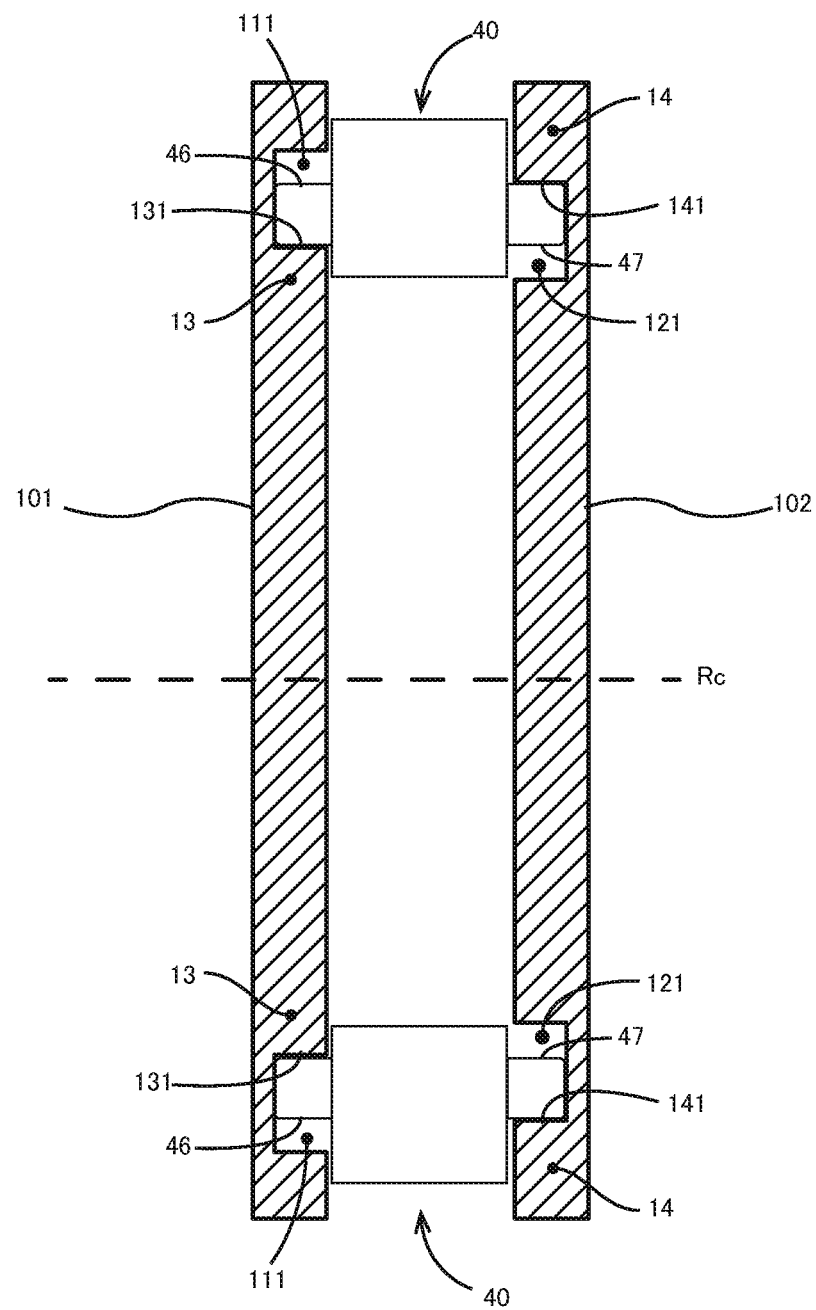
FIG. 19 is a cross-sectional view showing rails in FIG. 18 along with the blocks.

As shown in FIG. 19, an inner wall (guide face) of the groove 111 of the rail plate 101 having the greater radius serves as a guide face 131 on which the outer ring of the cam follower 46 on one side face of the block 40 rolls. An outer wall (guide face) 141 of the groove 121 of the rail plate 102 having the smaller radius serves as a guide face 141 on which the outer ring of the cam follower 47 on the opposite side of the block 40 rolls. That is, the inner side face of the outer groove 111 serves as the guide face 131 of the inner rail 13 that guides the cam follower 46 on one side face of the block 40 from inside and defines the trajectory of the block train 30 from inside, and the part including the inner side face of the outer groove 111 serves as the inner rail 13 described above. Similarly, the outer side face of the inner groove 121 serves as the guide face 141 of the outer rail 14 that guides the cam follower 47 on the opposite side of the block 40 from outside and defines the trajectory of the block train 30 from outside, and the part including the outer side face of the inner groove 121 serves as the outer rail 14 described above.

Figure 20:
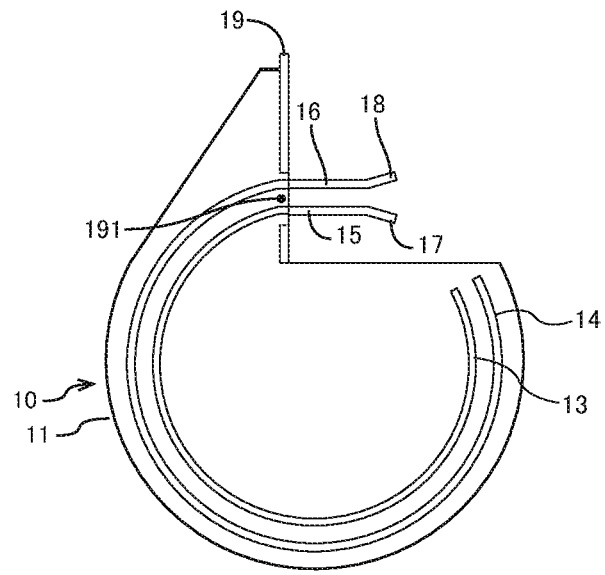
FIG. 20 is a side view showing a modification of the rails in FIG. 15.

As shown in FIG. 20, to guide the block train 30 onto the straight rails 15 and 16, a pair of auxiliary rails 17 and 18 that expand in a reverse tapered shape along the forward direction may be connected to the leading ends of the straight rails 15 and 16.

Figure 21:
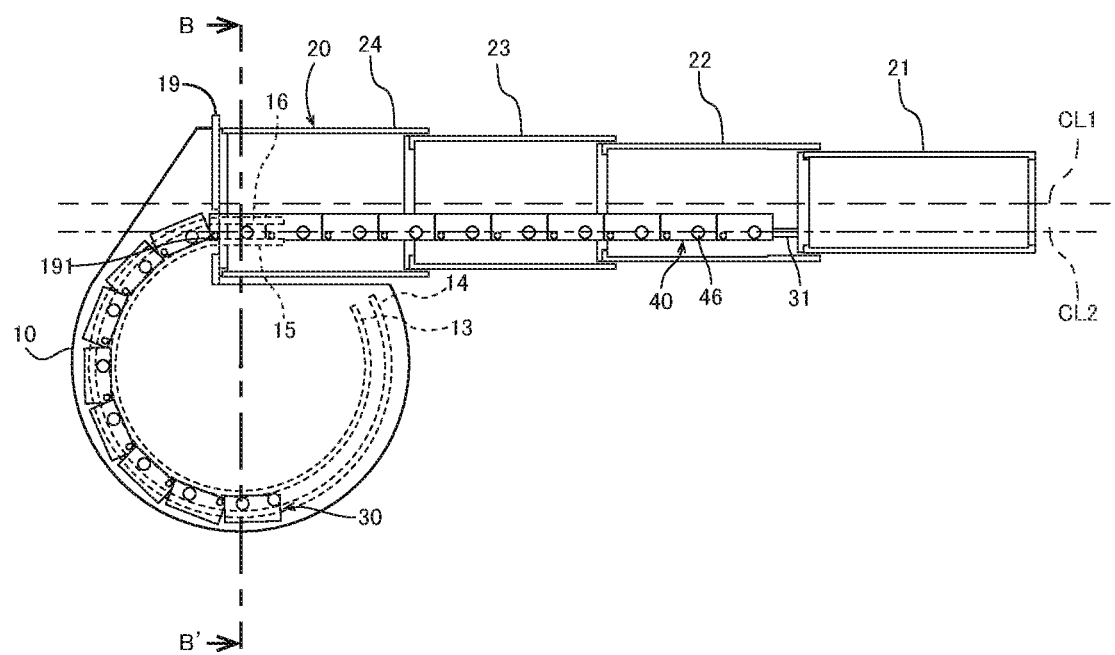
FIG. 21 is a side view showing a modification of the block train forming the linear expansion mechanism in FIG. 4 along with the arm unit in the expanded state.

As shown in FIG. 21, the block train 30 preferably has such an overall length that the block train 30 circumferentially extends over at least a half of the housing part when the block train 30 is delivered over the furthest distance to expand the arm unit 20 to the maximum. This ensures that even if an external force about the cylinder centerline CL1, that is, an external torsional force is exerted on the arm unit, the external force is transmitted from the block 40 at the leading end connected to the arm unit 20 to the entire block train 30 in a cascade manner. In order to reduce the torsional error of the arm unit 20, the rigidity of the arm unit 20, the rigidity of the linear expansion mechanism 1, and the support rigidity thereof need to be improved, of course. According to this embodiment, however, the block train 30 has an overall length enough for the block train 30 remaining in the housing part to extend over at least a half of the circumference of the housing part as described above, which is a requirement for effectively reducing the torsional error.

Figure 22:
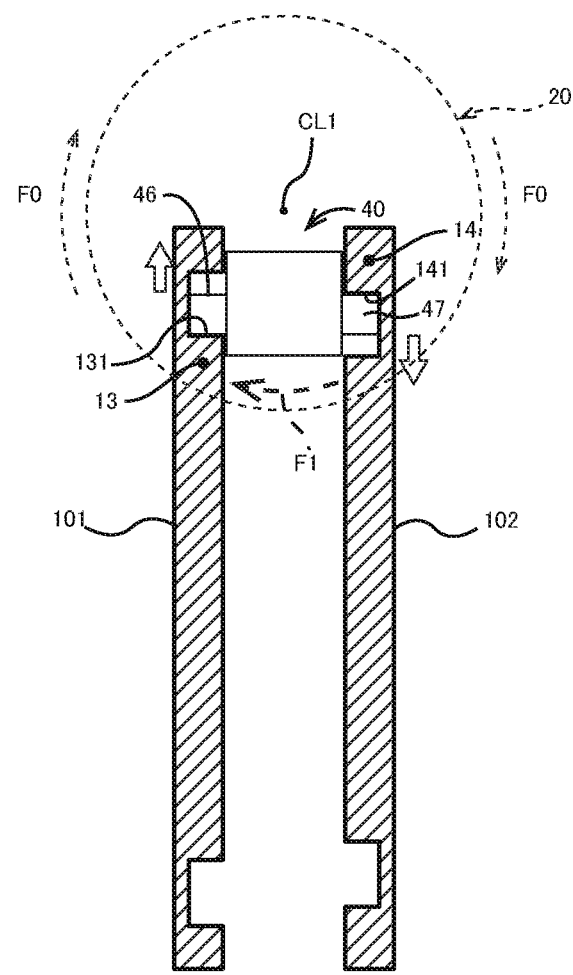
FIG. 22 is a cross-sectional view taken along the line B-B' in FIG. 21.

This will be described in more detail. As shown in FIG. 22, when an external force F0 is exerted to the arm unit 20 in the clockwise direction in the sheet of the drawing about the cylinder centerline CL1, for example, the external force F0 is exerted as forces F1 and F2 on the block train 30. The external force F1 acting on a block 40 closer to the opening 191 is exerted in the direction to separate the cam followers 46 and 47 from the guide faces 131 and 141 of the arc-shaped rails 13 and 14, respectively. However, the external force F2 acting on a block 40 remaining below the upper block 40 is exerted in the direction to press the cam followers 46 and 47 against the guide faces 131 and 141 of the arc-shaped rails 13 and 14, respectively. Therefore, not only when the arm unit 20 is not fully expanded but also the arm unit 20 is expanded to the maximum, the block train 30 can effectively help preventing a twisting of the arm unit 20 in cooperation with the rails 13 and 14. On the other hand, when the external force F0 is exerted to the arm unit 20 in the counterclockwise direction in the sheet of the drawing, the external force F2 acting on a lower block 40 is exerted in the direction to separate the cam followers 46 and 47 from the guide faces 131 and 141 of the arc-shaped rails 13 and 14, respectively, whereas the external force F1 acting on an upper block 40 is exerted in the direction to press the cam followers 46 and 47 against the guide faces 131 and 141 of the arc-shaped rails 13 and 14, respectively. In this case, again, the block train 30 can help preventing a twisting of the arm unit 20.

Figure 23:
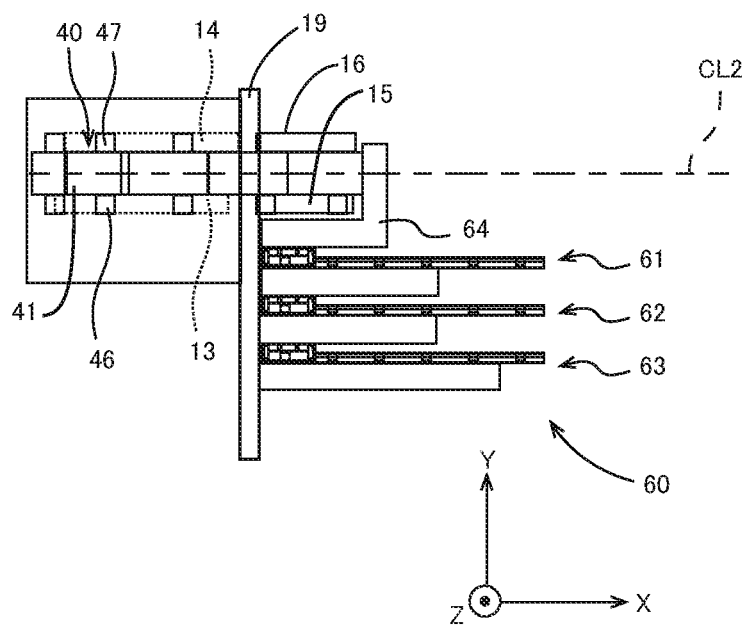
FIG. 23 is a plan view showing a linear expansion mechanism including a plurality of linear-motion guide mechanisms cascaded to each other instead of a telescopic structure.
Figure 24:
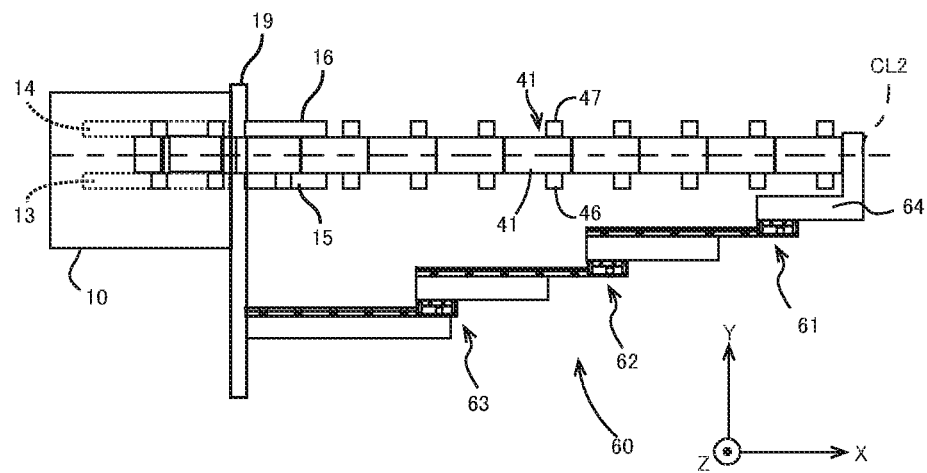
FIG. 24 is a plan view of the linear expansion mechanism in FIG. 23 in an expanded state.

The arm unit 20 according to this embodiment is not limited to the telescopic structure. For example, as shown in FIGS. 23 and 24, an arm unit 60 may be formed by a plurality of linear-motion guide mechanisms 61, 62 and 63 cascaded to each other. Each of the linear-motion guide mechanism 61, 62 and 63 includes a slide rail (linear-motion element) and a slider. Of the plurality of linear-motion guide mechanism 61, 62 and 63, the linear-motion guide mechanisms 63 at the trailing end is fixed in a horizontal position to the lid plate 19 at the slide rail thereof, and the linear-motion guide mechanism 61 at the leading end is connected to the block 40 at the leading end of the block train 30 by an L-shaped connector 64 at the slider thereof, for example. As the block train 30 moves back and forth along the axis of movement CL2, the arm unit 60 expands and contracts. The linear expansion mechanism having the arm unit 60 having a different structure, more specifically, formed by the plurality of linear-motion guide mechanisms 61, 62 and 63, has the same advantages as the linear expansion mechanism 1 having the arm unit 20 having a telescopic structure.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A robot apparatus, comprising:
a base;
a strut unit standing on the base, the strut unit having a first rotational joint having a first axis of rotation perpendicular to the base; and
a linear expansion mechanism that is rotatably supported on the strut unit via a second rotational joint having a second axis of rotation perpendicular to the first axis of rotation,
the linear expansion mechanism comprises:
a plurality of linear-motion elements assembled in series to each other;
a block train including a plurality of blocks coupled to each other in a row, a block at a leading end of the plurality of blocks being connected to a linear-motion element at a leading end of the plurality of linear-motion elements; and
a housing part that houses the block train along an arc-shaped trajectory, the housing part being arranged below a linear-motion element at a trailing end of the plurality of linear-motion elements and above the strut unit,
wherein at least a part of the block train is arranged inside the plurality of linear-motion elements.

2. The robot apparatus according to claim 1, wherein a center of the arc-shaped trajectory lies on the second axis of rotation.

3. The robot apparatus according to claim 1, wherein the housing part has an arc-shaped rail that allows the block train to move in the arc-shaped trajectory, and
a projection body to be engaged with the arc-shaped rail is provided on a side face of each of the blocks.

4. The robot apparatus according to claim 3, wherein the projection body is provided on the block at a position where, when viewed in side view, a centerline of the projection body lies on a circle that is concentric with the arc-shaped rail along with rotating shafts that couple the blocks to each other in the housing part.

5. The robot apparatus according to claim 1, wherein the block train has a length enough for the part of the block train remaining in the housing part to extend over at least a half of the arc-shaped trajectory when the block train is delivered over a longest distance from the housing part.

6. A robot apparatus, comprising:
a base;
a strut unit standing on the base, the strut unit having a first rotational joint having a first axis of rotation perpendicular to the base; and
a linear expansion mechanism that is rotatably supported on the strut unit via a second rotational joint having a second axis of rotation perpendicular to the first axis of rotation,
the linear expansion mechanism comprises:
a plurality of linear-motion elements assembled in series to each other;
a block train including a plurality of blocks coupled to each other in a row, a block at a leading end of the plurality of blocks being connected to a linear-motion element at a leading end of the plurality of linear-motion elements; and
a housing part that houses the block train along an arc-shaped trajectory, the housing part being arranged below a linear-motion element at a trailing end of the plurality of linear-motion elements and above the strut unit,
wherein the plurality of linear-motion elements includes a plurality of cylindrical bodies assembled in a multi-level nested structure, and
the blocks are coupled to each other by rotating shafts in a coupling direction perpendicular to the rotating shafts in such a manner that the blocks are prevented from rotating upward but are allowed to rotate downward, and inserted into the cylindrical bodies, the block at the leading end of the plurality of blocks being coupled to a cylindrical body at a leading end of the plurality of cylindrical bodies.

7. A robot apparatus, comprising:
a strut unit; and
a linear expansion mechanism arranged on the strut unit,
wherein the linear expansion mechanism comprises:
an arm unit capable of expansion;
a block train including a plurality of blocks rotatably coupled to each other in a row, a block at a leading end of the plurality of blocks being coupled to a front end of the arm unit; and
a housing part that houses the block train along an arc-shaped trajectory at a location below a rear end of the arm unit and above the strut unit,
wherein at least a part of the block train is arranged inside the arm unit.

* * * * *